(12) United States Patent
Marugame

(10) Patent No.: US 8,696,897 B2
(45) Date of Patent: Apr. 15, 2014

(54) GRAY WATER RECYCLING SYSTEM

(76) Inventor: Lance M. Marugame, Honolulu, HI (US)

(*) Notice: Subject to any disclaimer, the term of this patent is extended or adjusted under 35 U.S.C. 154(b) by 547 days.

(21) Appl. No.: 13/151,070

(22) Filed: Jun. 1, 2011

(65) Prior Publication Data

US 2012/0090707 A1 Apr. 19, 2012

Related U.S. Application Data

(60) Provisional application No. 61/393,825, filed on Oct. 15, 2010.

(51) Int. Cl.
| | | |
|---|---|---|
| *C02F 9/00* | (2006.01) | |
| *C02F 1/76* | (2006.01) | |
| *C02F 1/00* | (2006.01) | |
| *C02F 1/28* | (2006.01) | |
| *C02F 1/50* | (2006.01) | |
| *E03B 1/04* | (2006.01) | |
| *E03D 5/00* | (2006.01) | |

(52) U.S. Cl.
CPC . *C02F 9/00* (2013.01); *C02F 1/006* (2013.01); *C02F 1/283* (2013.01); *C02F 1/50* (2013.01); *C02F 1/76* (2013.01); *E03B 1/042* (2013.01); *E03D 5/003* (2013.01)
USPC ........ 210/121; 210/206; 210/257.1; 210/258; 210/262

(58) Field of Classification Search
CPC ............ C02F 1/006; C02F 1/283; C02F 1/50; C02F 1/687; C02F 1/688; C02F 1/76; C02F 9/00; C02F 2001/007; C02F 2001/52; C02F 2103/002; C02F 2307/14; E03B 1/042; E03D 5/003
USPC .............. 210/121, 206, 255, 257.1, 258, 259, 210/262
See application file for complete search history.

(56) References Cited

U.S. PATENT DOCUMENTS

| | | |
|---|---|---|
| 4,358,864 A | 11/1982 | Medrano |
| 5,084,920 A | 2/1992 | Kimball |
| 5,100,540 A | 3/1992 | Ramirez et al. |
| 5,406,657 A | 4/1995 | Donati |
| 5,573,677 A | 11/1996 | Dembrosky |
| 6,474,111 B1 | 11/2002 | Pattee |
| 6,702,942 B1 | 3/2004 | Nield |
| 6,911,189 B1 | 6/2005 | Koller et al. |
| 2006/0144769 A1 | 7/2006 | Okros |
| 2008/0245713 A1 | 10/2008 | Martinello |
| 2010/0125938 A1 | 5/2010 | Billon |

*Primary Examiner* — Lucas Stelling
(74) *Attorney, Agent, or Firm* — Richard C. Litman

(57) ABSTRACT

The gray water recycling system includes a first holding tank for filtering and storing gray water from a washer. The processed water passes through an inline filter to a second holding tank. The second holding tank includes a first float switch operatively associated with a pump that shuts off power to the pump when the second tank contains less than a predetermined amount of processed water. An outlet pipe inside the second tank includes another filter to clean the processed water as the water passes through the outlet pipe. A second float switch activates the pump to pump the processed water to a toilet tank when the toilet tank water drains below a predetermined level. A battery power unit is operatively connected to the pump, providing power for selective operation thereof.

16 Claims, 4 Drawing Sheets

GRAY WATER RECYCLING SYSTEM

CROSS-REFERENCE TO RELATED APPLICATION

This application claims the benefit of U.S. Provisional Patent Application Ser. No. 61/393,825, filed Oct. 15, 2010.

BACKGROUND OF THE INVENTION

1. Field of the Invention

The present invention relates to water conservation systems, and more specifically to a gray water recycling system for converting laundry wastewater into water that can be used for toilets and similar applications.

2. Description of the Related Art

In a world of ever diminishing natural resources, it is imperative that consumption of such resources should be maximized to the fullest extent. That requires recycling as one of several ways to help preserve the environment and prevent unnecessary waste.

One of most common resources subject to waste is water. Activities such as lavatory use, laundry, dishwashing, showers and baths consume water inefficiently either by using much more than necessary and/or non-recovery of the used water. This places additional strain on the sewage systems, which inevitably leads to increased costs to the average consumer.

Water recovery systems have been proposed that recycle gray water from laundry and washbasins to be used as flushing water for toilets. These usually involve filtering and storing the gray water in holding tanks to be pumped whenever needed. While generally sufficient for normal use, there does not appear to be a system to adequately clean the water to a reusable state and control the use thereof in a wide range of situations.

Thus, a gray water recycling system solving the aforementioned problems is desired.

SUMMARY OF THE INVENTION

The gray water recycling system includes a first holding tank for filtering and storing gray water from a washer. The processed water passes through an inline filter to a second holding tank. The second holding tank includes a first float switch operatively associated with a pump that shuts off power to the pump when the second tank contains less than a predetermined amount of processed water. An outlet pipe inside the second tank includes another filter to clean the processed water as the water passes through an outlet pipe. A second float switch activates the pump to pump the processed water to a toilet tank when the toilet tank water drains below a predetermined level. A battery power unit is operatively connected to the pump, providing power for selective operation thereof.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
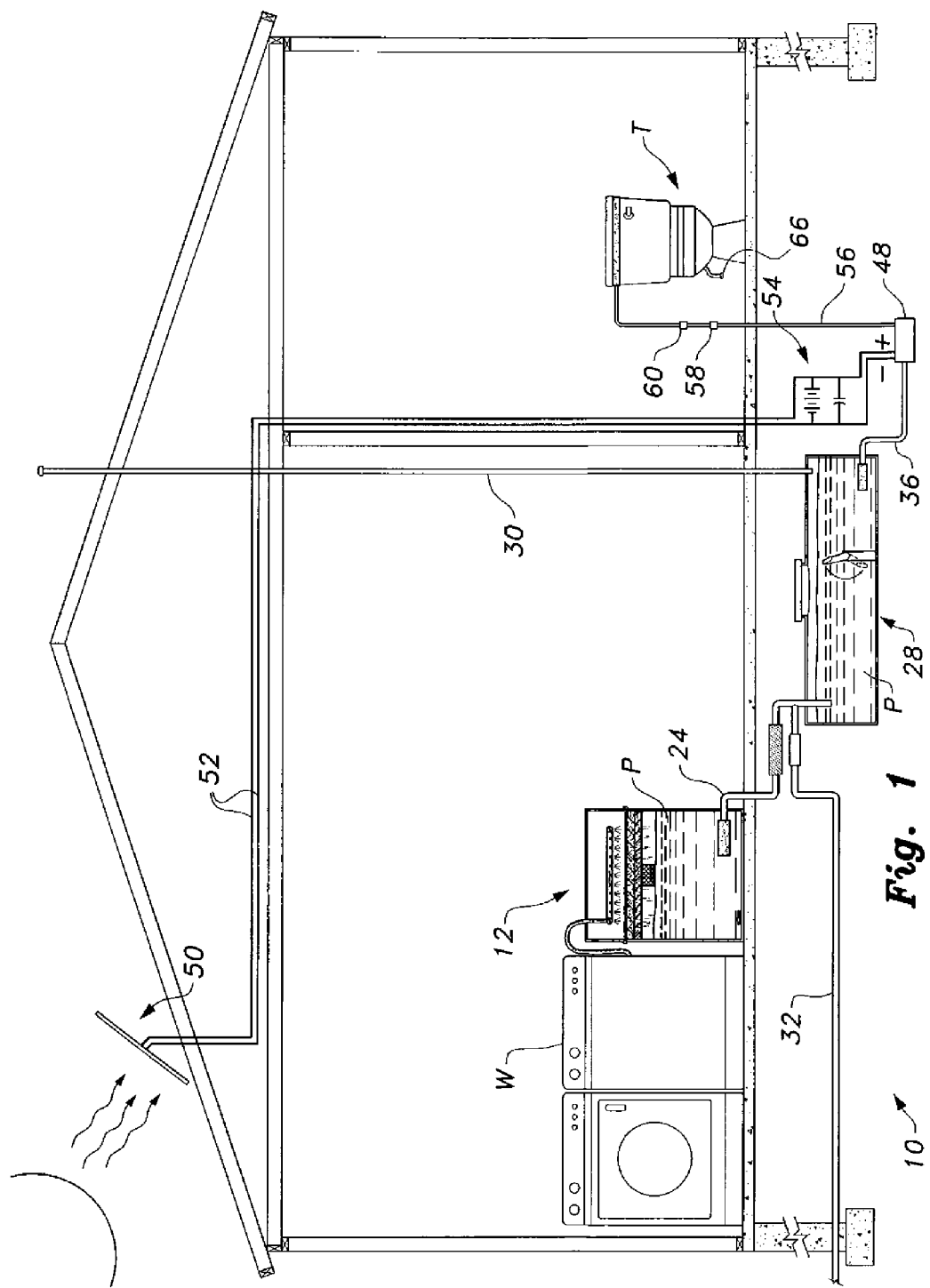
FIG. 1 is a schematic diagram showing an overall view of the components of a gray water recycling system according to the present invention.

The present invention relates to a gray water recycling system, generally referred to by reference number 10 in the drawings, for recovering or recycling used or gray water from a washer W in a domicile to be used as flushing water for a toilet T. As shown in FIG. 1, the gray water recycling system 10 includes a primary or first holding tank 12 for filtering and holding gray water. The processed water P is piped to a secondary or second holding tank 28. A selectively operated pump 48 pumps the processed water from the second holding tank 28 to a toilet tank 62.

Figure 2:
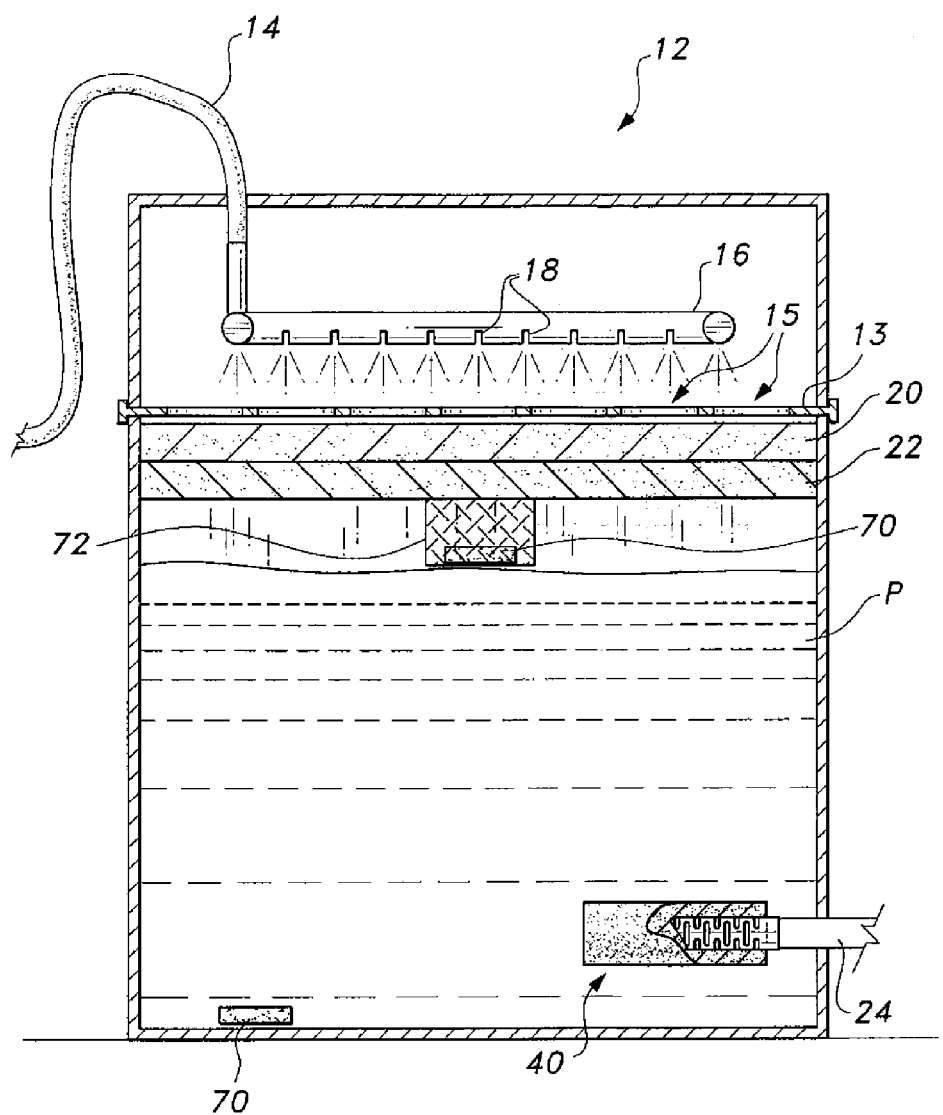
FIG. 2 is a side view in section of a first holding tank in a gray water recycling system according to the present invention.

Referring to FIGS. 1 and 2, the gray water is pumped through a flexible pipe 14 to a gray water distribution assembly 16 near the top of the first holding tank 12. In the exemplary embodiment, the first holding tank 12 may have a capacity of one hundred gallons. Alternatively, any other desired capacity tanks may be used. The force for pumping the gray water is supplied by the wastewater discharge pump in the washer W. The gray water distribution assembly 16 includes a planar arrangement of pipes with a plurality of slits 18 formed at the bottom thereof. As the gray water enters the pipes, the gray water is sprayed through the slits 18 towards the bottom of the first holding tank 12. It is preferable that any open ends in the pipes be capped to preserve water pressure for spraying the gray water.

A two-stage filtration assembly is disposed below the gray water distribution assembly 12. The spraying action of the gray water distribution assembly 12 efficiently distributes the gray water over the entire surface of the filtration assembly. The filtration assembly includes a first filter 20 and a second filter 22. The first filter 20 may be a layer of activated charcoal for performing a coarse filtration of the gray water, which will also prevent a range of relatively large solid matter from passing through. The second filter 22 may be a layer of polypropylene with a fine mesh for cleaning the remainder of smaller size particulate matter. Moreover, either one or both of the filters may include biocide agents to help eliminate potentially harmful bacteria. As an additional measure, the first holding tank 12 may include a top or cover 13 with a plurality of holes 15 for the gray water to pass towards the two-stage filtration assembly. The cover 13 may overlie the first filter 20 to capture even larger sized debris such as twigs and bits of fabric.

The processed water P from the first holding tank 12 is then passed to the second holding tank 28 through an intermediate pipe 24. The intermediate pipe 24 may include an inline or third filter 26 to further clean the processed water P. The third filter 26 may be another form of polypropylene fine mesh. Since the second holding tank 28 is disposed at a lower level from the first holding tank 12, gravity is sufficient to move the water from the first holding tank 12 to the second holding tank 28. If more pressure is needed, a pump may be operatively connected to the intermediate pipe 24.

Figure 3:
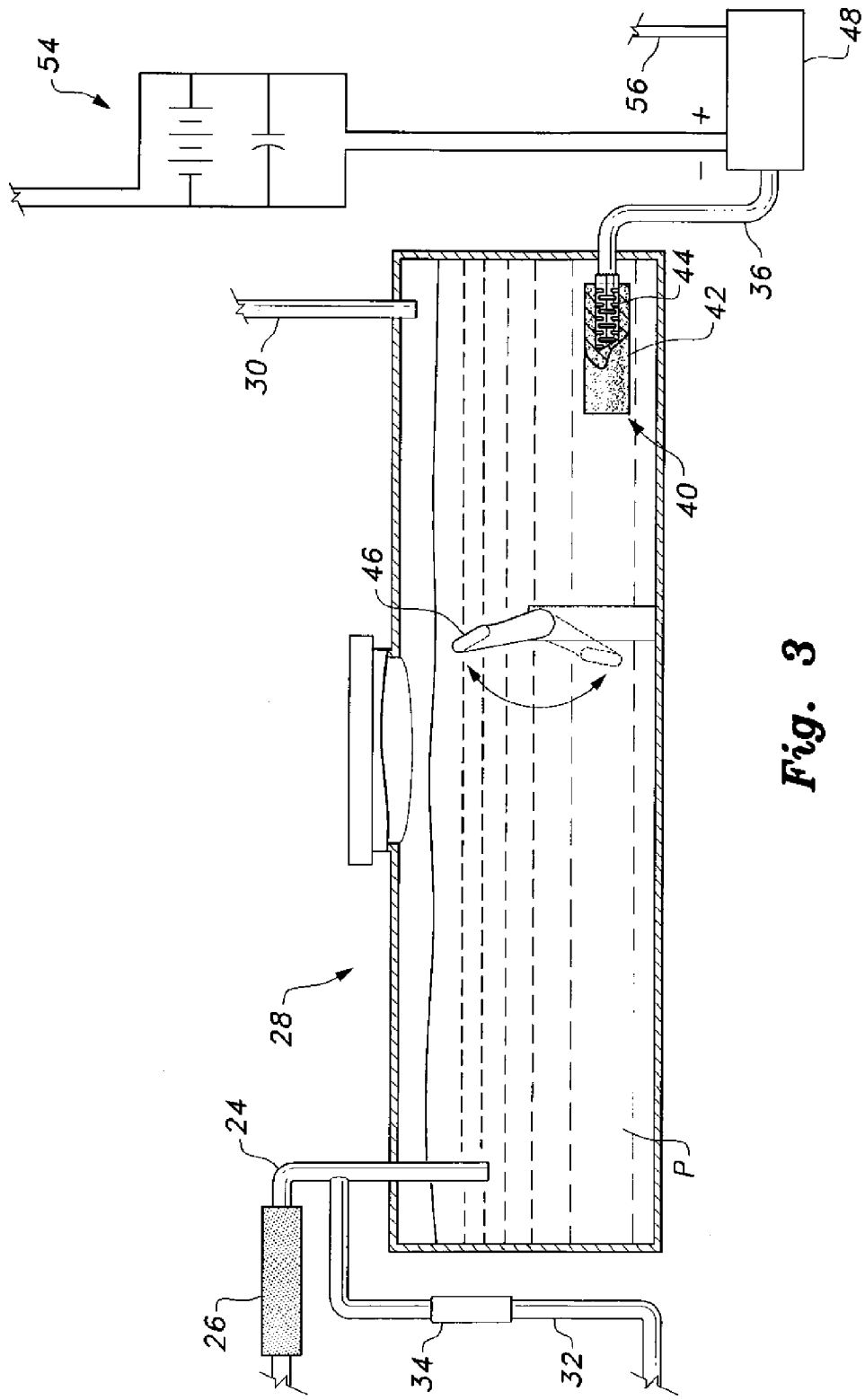
FIG. 3 is a side view in section of a second holding tank in a gray water recycling system according to the present invention.

As shown in FIGS. 1 and 3, the second holding tank 28 includes a vent 30 at one end and an exit or outlet pipe 36. The second holding tank 28 preferably has a capacity of about one hundred twenty gallons, but again, any desired capacity may be used. As the processed water P from the first holding tank 12 enters the second holding tank 28, any trapped air inside the second holding tank 28 can prevent efficient flow and fill of the same. Hence, the vent 30 allows air to escape. Depending on regulations, the vent 30 may be a long pipe permitting air to escape outside the dwelling, or a short pipe to permit air to escape within the confines of the second holding tank 12 storage space, e.g., a basement.

In case of an overflow, the second holding tank 28 includes an overflow pipe 32 directing excess processed water P to sewage or ground. A one-way check valve 34 on the overflow pipe 32 prevents any water from flowing back into the second holding tank 28.

The second holding tank 28 is the main tank supplying water to flush the toilet T. As such, a selectively operable pump 48 is connected to the second holding tank outlet 36 and to the toilet tank supply pipe 56. The outlet 36 may include a fourth filter 40 to further clean the processed water P prior to being pumped into the toilet tank 62. The fourth filter 40 may be a foam sleeve 42 surrounding perforations 44 at the outlet end inside the second holding tank 28. If desired, a similar fourth filter 40 may be provided on the inlet side of the intermediate pipe 24 as shown in FIG. 2. However, a second pump may be needed to move the processed water P between the holding tanks 12, 28 to overcome the restrictive flow through the additional fourth filter 40.

The second holding tank 28 also includes a first float switch 46 disposed inside the second holding tank 28. The first float switch 46 is operatively connected to the pump 48 so that when the water level is below a predetermined amount, the first float switch 46 is in the OFF position (shown in phantom lines), resulting in power to the pump 48 being shut off. This indicates that insufficient water is available to flush the toilet T. When the water level is at or above the predetermined level, the first float switch 46 is in the ON position (shown in solid lines). This allows the power supply to the pump 48 to be activated when needed.

The power source for the pump 48 is a battery 54. The battery 54 may be a 12-volt type, and the battery 54 may be charged by a solar panel 50 through the interconnecting wires 52. Other alternative energy sources, such as windmills, may also be used.

Figure 4:
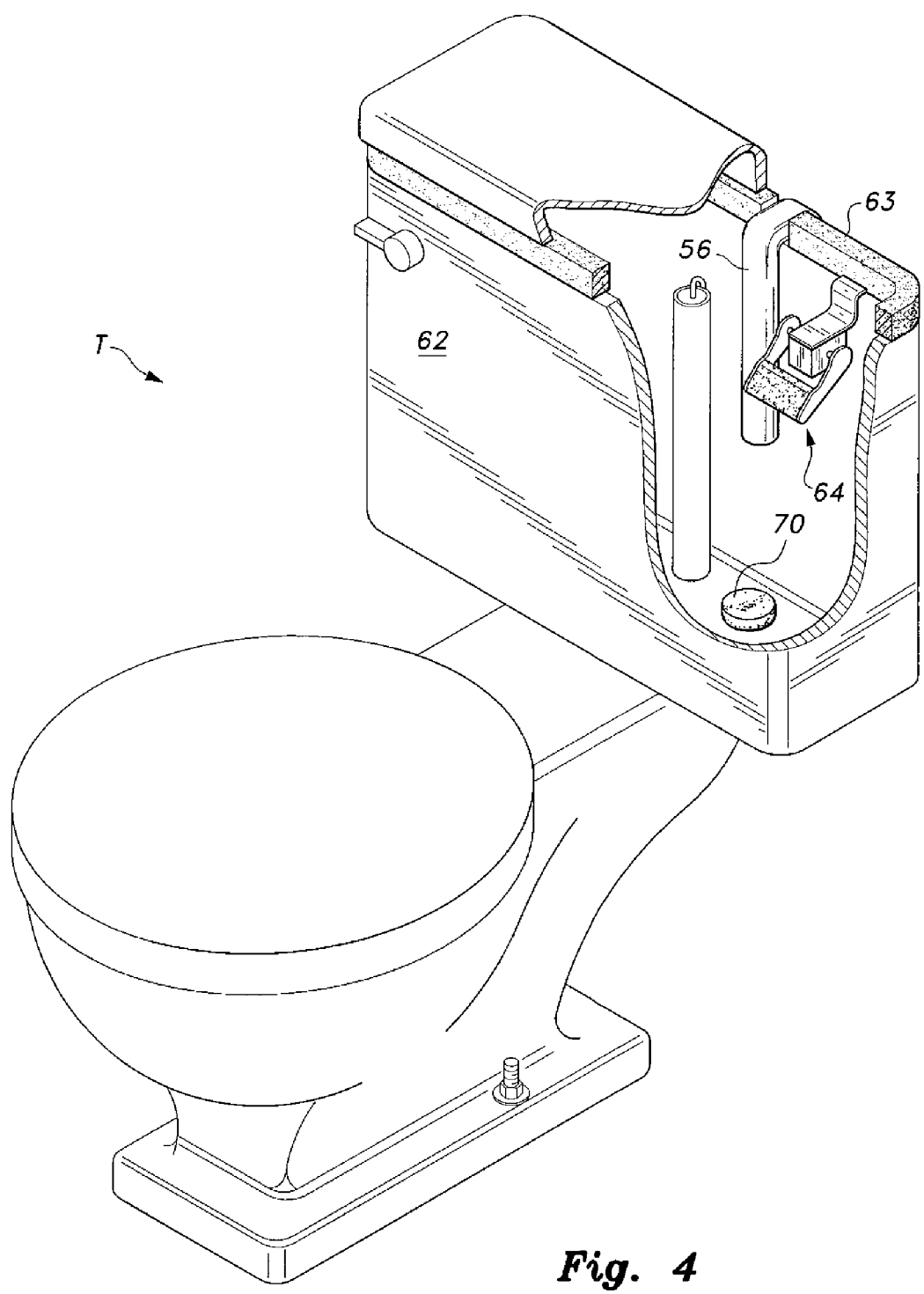
FIG. 4 is a perspective view of a toilet tank in a gray water recycling system according to the present invention, shown with the water tank broken away and partially in section to show details thereof.

As shown in FIGS. 1 and 4, the supply pipe 56 directs water from the pump 48 into the toilet tank 62. The supply pipe 56 includes an intake valve 58, which opens or closes to regulate the flow of processed water P, and a one-way check valve 60 downstream of the intake valve 58. The check valve 60 prevents back flow through the supply pipe 56. The outlet end of the supply pipe 56 may be bent over the top rim of the toilet tank 62 to minimize any substantial alterations to the toilet tank 62, e.g., drilled holes. As a result, the rim is uneven due to the additional height formed by the bent portion of the supply pipe 56, which can prevent the toilet tank cover from covering the toilet tank 62 in a level fashion. To level the rim, a gasket ring 63 may be disposed along the rim of the toilet tank 62, the ring 63 having a height or thickness substantially equal to the height of the bent portion. The gasket ring 63 may be rubber, plastic or foam.

As shown in FIG. 4, the toilet tank 62 also includes a second float switch 64 adjustably mounted on a bracket. The second float switch 64 performs the same function as a typical float valve in standard toilets. However, the second float switch 64 operates in a reverse manner with respect to the first float switch 46. In the down position as shown in FIG. 4, the second float switch 64 is in the ON position to thereby activate the pump 48 and fill the toilet tank 62. As the supplied water fills the tank to a predetermined level, the second float switch 64 rises to an OFF position, which deactivates the pump 48. If there is insufficient supply of water in the second holding tank 28, the user may shut off the intake valve 58 and open the standard intake valve 66 to utilize the normal water in the domicile. Hence, the standard intake valve 66 would normally be closed when using the gray water recycling system 10.

The gray water recycling system 10 may include additional means of cleaning and purifying the waste in the form of chlorine tablets 70. These chlorine tablets may be placed in the first holding tank 12, the second holding tank 28 and/or the toilet tank 62 to help destroy potentially harmful germs and bacteria. Moreover, a tablet holder or basket 72 may be disposed below the second filter 22 to help sanitize the filtered gray water as the gray water flows into the first holding tank 12.

Thus, it can be seen that the gray water recycling system 10 recovers and recycles gray water for use as toilet tank flushing water. The numerous filters within the system sufficiently clean the gray water to a usable state, and the float switches insure operation of the pump 48 only when needed. The gray water recycling system 10 also includes safeguards for overflow and emergency issues.

It is noted that the gray water recycling system 10 encompasses a variety of alternatives. For example, the first and second float switches 46, 64 may use alternative float switch systems having a buoyant element that rises and lowers with the level of water. Instead of two holding tanks, the gray water recycling system 10 may use a single tank connected to the pump 48 when the tank and the toilet are on the same elevation. Moreover, the gray water recycling system 10 may also be employed with washbasins, sinks and baths.

It is to be understood that the present invention is not limited to the embodiments described above, but encompasses any and all embodiments within the scope of the following claims.

I claim:

1. A gray water recycling system, comprising:
    a first holding tank adapted for holding gray water from a clothes washer, the first holding tank being disposed at an elevation, the first holding tank having:
        a gray water distribution assembly disposed near a top portion of the first holding tank, the gray water distribution assembly having an inlet adapted for connection to the washer; and
        a two-stage filtration assembly disposed below the gray water distribution assembly, the gray water distribution assembly spraying gray water over the two-stage filtration assembly;
    an elongated second holding tank disposed at an elevation below the elevation of the first holding tank, the second holding tank having:
        an overflow pipe at one end of the second holding tank;
        a vent disposed at the other end of the second holding tank, the vent permitting air to escape as the second holding tank is being filled from the first holding tank;
        an outlet for passing the water from the second holding tank; and
        a first float switch disposed inside the second holding tank;
    an intermediate pipe connecting the first and second holding tanks to pass water from the first holding tank to the second holding tank;
    a pump operatively connected to the outlet of the second holding tank, the pump being adapted for pumping water to a toilet tank, the pump being adapted for connection to a power source, the first float switch shutting off power to the pump when water level in the second holding tank is below a predetermined amount;

a supply pipe operatively connected to the pump to distribute water from the pump to the toilet tank; and a second float switch adapted for placement in the toilet tank, the second float switch being movable between first and second positions, the first position being at or below a predetermined water level in the toilet tank, the second position being below the predetermined water level, the second float switch activating the pump when the second float switch is at the second position to commence filling the toilet tank with water.

2. The gray water recycling system according to claim 1, wherein said gray water distribution assembly comprises a plurality of perforated pipes, the perforations in the pipes facilitating spray of the gray water over said two-stage filtration assembly.

3. The gray water recycling system according to claim 1, further comprising a perforated cover overlying said two-stage filtration assembly.

4. The gray water recycling system according to claim 1, wherein said two-stage filtration assembly comprises:

a first filter disposed below said gray water distribution assembly, said first filter being adapted to provide coarse filtration of the gray water; and a second filter disposed below the first filter, the second filter being adapted to provide fine filtration of the gray water.

5. The gray water recycling system according to claim 4, wherein said first filter comprises a layer of activated charcoal.

6. The gray water recycling system according to claim 4, wherein said second filter comprises a layer of polypropylene with a fine mesh.

7. The gray water recycling system according to claim 1, further comprising a third filter disposed inline on said intermediate pipe 24, said third filter providing further filtration of water from said first holding tank.

8. The gray water recycling system according to claim 7, wherein said third filter comprises polypropylene having a fine mesh.

9. The gray water recycling system according to claim 1, wherein said power source comprises a battery operatively connected to said pump.

10. The gray water recycling system according to claim 7, further comprising a solar panel operatively connected to said battery, the solar panel providing charge for said battery.

11. The gray water recycling system according to claim 1, further comprising perforations defined in said outlet and a fourth filter surrounding the perforations, the fourth filter filtering the water flowing towards said pump.

12. The gray water recycling system according to claim 11, wherein said fourth filter comprises a foam sleeve.

13. The gray water recycling system according to claim 1, wherein said supply pipe comprises an intake valve and a one-way check valve downstream of the intake valve, said supply pipe regulating water being pumped from said second tank, the check valve preventing back flow through said supply pipe.

14. The gray water recycling system according to claim 1, further comprising a gasket ring adapted to be placed on the rim of the toilet tank, the gasket ring leveling the rim for the toilet tank cover.

15. The gray water recycling system according to claim 1, further comprising at least one chlorine tablet disposed in said first and second holding tanks and in said toilet tank, the at least one chlorine tablet sanitizing water contained in said tanks.

16. The gray water recycling system according to claim 15, further comprising a tablet holder disposed below said second filter, the tablet holder being adapted to hold said at least one chlorine tablet.

* * * * *